United States Patent [19]

Heijne

[11] Patent Number: 5,024,086

[45] Date of Patent: Jun. 18, 1991

[54] METHOD OF MEASUREMENT OF THE LEVEL OF THE SURFACE OF A METAL BATH

[75] Inventor: Wilhelmus Heijne, Uitgeest, Netherlands

[73] Assignee: Hoogovens Groep B.V., Ijmuiden, Netherlands

[21] Appl. No.: 464,692

[22] Filed: Jan. 16, 1990

Related U.S. Application Data

[63] Continuation-in-part of Ser. No. 312,877, Feb. 21, 1989, abandoned.

[30] Foreign Application Priority Data

Feb. 26, 1988 [NL] Netherlands ................... 8800491

[51] Int. Cl.⁵ .................... G01F 23/22; G01F 23/00
[52] U.S. Cl. ............................... 73/292; 73/291; 73/290 R; 266/79; 374/26; 374/139; 374/140
[58] Field of Search ............... 73/291, 292, 290 R; 374/26, 139, 140; 266/79, 94; 204/422, 423

[56] References Cited

U.S. PATENT DOCUMENTS

| | | | |
|---|---|---|---|
| 3,708,159 | 1/1973 | De Bray | 266/94 |
| 4,354,382 | 10/1982 | Hägglund | 73/290 R |
| 4,413,810 | 11/1983 | Tenberg et al. | 266/94 |
| 4,580,449 | 4/1986 | Hatono et al. | 73/290 R |
| 4,708,191 | 11/1987 | Block et al. | 73/290 R |
| 4,794,335 | 12/1988 | Linder | 73/290 R |

FOREIGN PATENT DOCUMENTS

| | | | |
|---|---|---|---|
| 493464 | 11/1976 | Australia. | |
| 514863 | 3/1981 | Australia. | |
| 63-83208 | 4/1988 | Japan | 266/94 |
| 514498 | 1/1978 | U.S.S.R. | 266/94 |
| 1082831 | 3/1984 | U.S.S.R. | 266/94 |

Primary Examiner—William A. Cuchlinski, Jr.
Assistant Examiner—Diego F. F. Gutierrez
Attorney, Agent, or Firm—Stevens, Davis, Miller & Mosher

[57] ABSTRACT

The level of the surface of a bath of molten metal beneath a fluid layer of slag in a metallurgical vessel is measured by a detector which is moved through the slag layer into the metal bath and then withdrawn. To improve accuracy and to avoid the need for a separate measurement the detector used comprises an oxygen concentration sensor which emits signals indicating the boundary between the molten metal and the slag, whereby the height of said boundary is determined.

5 Claims, 2 Drawing Sheets

METHOD OF MEASUREMENT OF THE LEVEL OF THE SURFACE OF A METAL BATH

This application is a continuation-in-part of application Ser. No. 312,877, filed Feb. 21, 1989 now abandoned.

BACKGROUND OF THE INVENTION

1. Field of the Invention

The invention relates to a method of measurement of the level of the surface of a bath of molten metal beneath a fluid layer of slag in a metallurgical vessel, using a detector which is moved through the slag layer into the metal bath and then withdrawn. The method is especially applicable in steel making.

2. Description of the Prior Art

A method as described above is known from NL-A-8005997.

When carrying out metallurgical processes in a metallurgical vessel, such as a furnace, ladle or tundish, it is often important to have accurate knowledge about the height of the bath surface of the metal, for example in order to obtain an impression of the wear of a refractory lining of a furnace. Knowledge about this bath level may also be important if a blowing lance, which is moved to just above the bath surface, is being operated for example for blowing oxygen onto the bath.

In steel making, typically a steel ladle is first filled with a quantity of scrap onto which pig iron is then cast. Then oxygen is blown onto the metal bath via a blowing lance for about twenty minutes. After the blow-period an intermediate pause is introduced, in which several measurements are made on the metal bath, including determination of the carbon content. These measurements are carried out using a so-called sublance with a detector attached to it, in order to bring the detector below the fluid layer of slag floating on the metal bath. When the measurements are completed, the sublance is withdrawn and another relatively short blow-period usually follows in order to obtain the desired quality of the metal bath, which has become steel. The duration of this shorter, second blow-period depends on at least one of the measurements carried out. At the end of the second blow-period, a final pause may occur during which it is usual again to move the sublance with a detector into the steel ladle in order to check the result achieved.

The measurements carried out during the intermediate pause are limited to the measurement of temperature, carbon content and to taking a steel sample for analysis purposes. The measurements carried out during the final pause also relate to temperature measurement and steel sample taking. In that case, however, assessing the carbon content may be replaced by oxygen measurement, on account of the accurate information concerning carbon content in low-carbon steel which this provides.

Only once in each 8 hours, that is to say every time the shift changes in the 24-hour per day operation, a bath height measurement is also carried out. To that end, shortly after the final pause measurement the sublance is brought into the steel ladle again with a detector which is suitable for measuring the bath level. NL-A-8005997 describes a resistance sensor suitable for this.

The reliability of this bath height level measurement is increased by combining the resistance measurement with a temperature measurement. In fact a temperature jump occurs when the detector is moved out of the metal bath into the slag. The resistance increase and the temperature increase should in principle form a good indication of the boundary between steel and slag.

However it is not always possible to determine reliably this temperature jump. In the event that, on final pause measurement it is found that the final temperature of the steel is too high, coolant scrap must be added for cooling. However, this results in disappearance of the temperature profile, as described, with a jump in temperature between steel and slag. In that case the result of the bath level measurement must be based only on the measurement of the change in resistance, which itself provides an uncertain measurement.

AU-B-514863 also describes measurement of the height of a steel bath in a converter or other vessel by insertion and withdrawal of a probe. An electrode is lowered through the slag layer to make electrical contact with the metal bath, completing a circuit. The voltage due to resistance of this circuit, drops when the contact is made, this giving the position of the metal surface. This measurement also requires a special step in the steel-making process.

SUMMARY OF THE INVENTION

The object of the invention is to make redundant the extra measurement for assessing the bath height level, after the final pause measurement. The invention provides further advantages which will be explained below.

The invention consists in that the detector comprises an oxygen sensor which emits signals which indicate the boundary of the molten metal and the slag layer. With knowledge of the height position of the detector, the position of this boundary is then determined. This method has the advantage that the usual measurement of oxygen concentration during the final pause is also used for assessing the bath height, without modification of the detector. This means that information about the bath height is available much more frequently, in fact after each charge, e.g. after approximately every half hour. It enables better monitoring of wear of the wall of the steel ladle.

With this method of determining bath height, it is also possible to make use of temperature measurement for a more reliable determination of the bath. The temperature measurement, and thus also the bath level measurement, is not negatively affected by cooling processes as described above, because any cooling operation will now take place after the measurement.

It is therefore preferred in the invention that the detector also has a temperature sensor.

Furthermore, with the invention the advantage is achieved that the costs of the separate bath level sensor used up to now are saved and that in particular more effective production time becomes available by the omission of a separate bath level measurement.

It has been found that with the method of the invention, very accurate determination of the steel/slag boundary is possible. Preferably the measurement is made as the detector is being withdrawn, when an increase in the output signal of the oxygen concentration sensor is used for detection of the boundary. Here a jump increase in the oxygen level measured is particularly useful.

BRIEF INTRODUCTION OF THE DRAWINGS

A preferred embodiment of the invention will now be described by way of non-limitative example with reference to the accompanying drawings, in which:

FIG. 1 shows graphically test results obtained in accordance with the known method using a resistance sensor, as described above, and a temperature sensor, and FIG. 2 shows graphically test results obtained in accordance with the method of the invention using an oxygen concentration sensor and a temperature sensor.

DESCRIPTION OF THE PREFERRED EMBODIMENT

Figure 1:
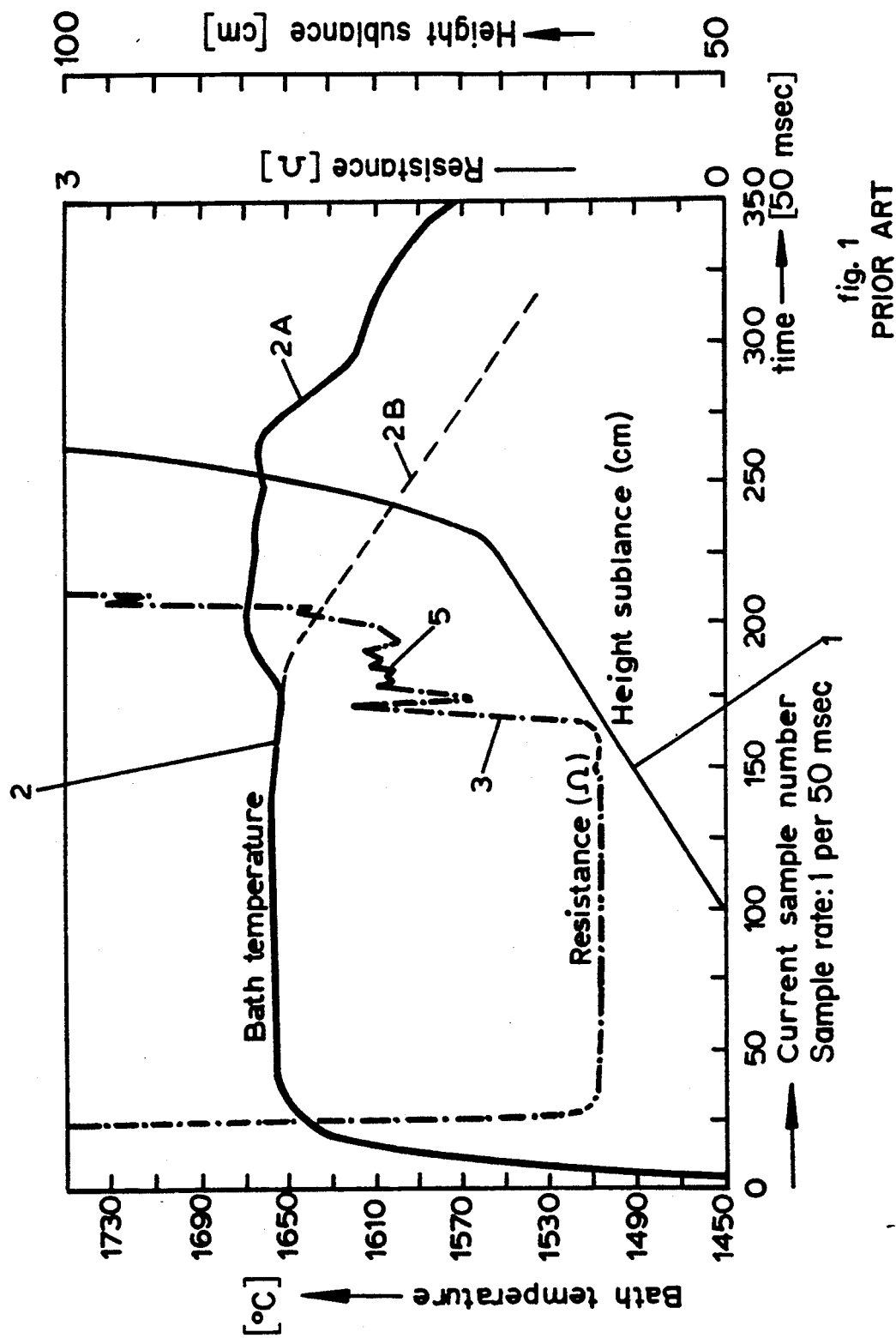
Figure 2:
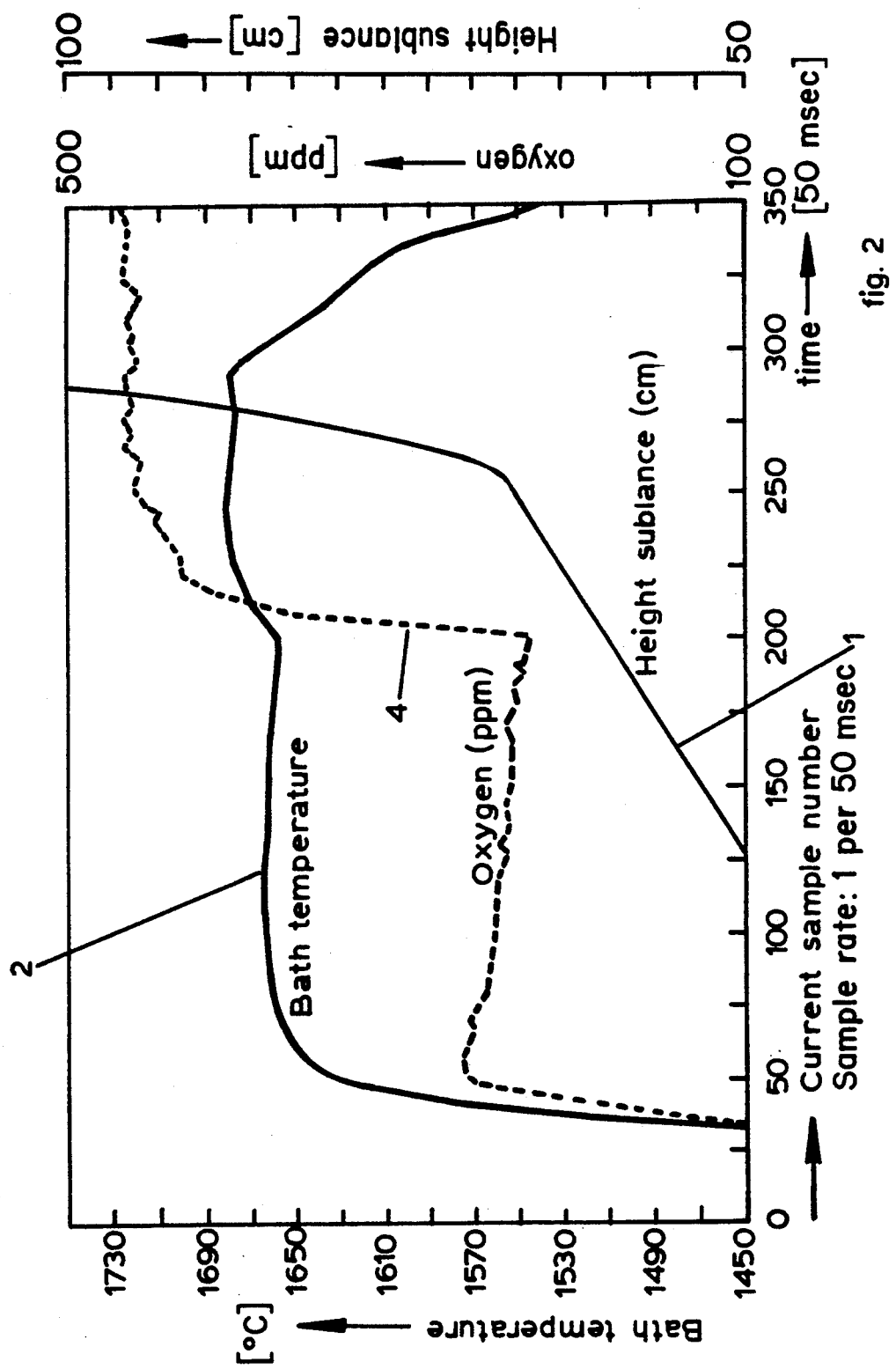

In both Figures the curve 1 shows the position of the sublance onto which the detector is attached in relation to a steel ladle into and out of which the detector is moved, to detect the level of the steel bath beneath the slag layer. For simplicity, units for this portion of the lance are not given. Sublances for taking measurements or samples from molten metal baths are well-known. Examples are described in NL-A-7808461, EP-A-113653, U.S. Pat. Nos. 4,141,249 and 4,438,653. No further description is necessary here. In FIGS. 1 and 2, the height of the sublance is shown only for the withdrawal of the detector from the molten metal through the slag. The insertion of the detector through the slag into the metal takes place immediately previously, as is indicated by the sharp rise in the temperature sensed (curve 2) by the temperature sensor at the left hand side. In both Figures, the level portion of the temperature curve 2 gives the bath temperature. After a suitable period in the bath, the detector is smoothly withdrawn, as shown by curve 1.

"Current sample number" means "actual sample number at the moment indicated on the x-axis".

"Sample rate" is one sample every 50 msec. (see Figures). Sample rate times Current sample number equals actual time passed. This actual time passed times the speed of withdrawal of the sublance equals the change of height of the sublance during the actual time passed.

"ppm" stands for parts per million.

"°C" stands for temperature in degrees centigrade.

In the known method of detecting bath level of FIG. 1 the measured electrical resistance of the steel or slag appears as the plotted signal 3 in FIG. 1, and is used for detecting the steel/slag boundary. A special bath level sensor is moved into the steel ladle after the final pause measurements. The sensor measures the electrical resistance. The resistance curve 3 measured is combined with temperature measurement signal 2 to give a value for the height of the steel/slag boundary. FIG. 1 shows both the situation in which the temperature measurement signal is not disturbed by the cooling which is started after the final pause, that is signal curve 2A, as well as the situation in which cooling does take place and gives temperature signal curve 2B. In the latter case at least, it can be seen that the temperature measurement cannot be combined reliably with the resistance measurement 3 to determine the bath level height.

FIG. 2 shows a test result of a bath level height measurement in accordance with the invention. Here an oxygen-concentration sensor, specifically the commercially available Electronite ML 76 20 75 26, was used on the sublance to detect oxygen concentration as the sublance is moved. This measurement makes the special separate test which is described with reference to FIG. 1 redundant. In the method exemplifying the invention, takes place during a final pause measurement of oxygen content for determining the final quality of the steel bath. The curve 4 is measured oxygen concentration level as the sublance is being lifted out. The temperature sensed simultaneously by a conventional temperature sensor on the sublance is also plotted as curve 2. The height curve 1 of the sublance is as in FIG. 1. Since in this case, any necessary cooling only takes place after this final pause measurement, a typical temperature curve is expected in accordance with signal 2. This includes a sharp jump increase in oxygen concentration at the point where the detector crosses the metal/slag boundary, which coincides with the rise in temperature sensed from the steady value of temperature in the bath. As can be seen, this is reliably combined with signal curve 4 in order to obtain an accurate bath level determination.

Both the oxygen signal and the bath temperature signal are processed in order to determine the point where a rise of these signals occurs. The thus determined points, together with the continuously determined height of the sublance at each signal indicates two heights for the metal-slag layer. Since the oxygen signal measurement gives the better indication of the two, the final determination of the metal-slag layer heavily relies on this oxygen measurement. In practice this may mean that the determination of the metal-slag layer is for 80% determined by the oxygen-measurement and for the remaining 20% it is determined by the bath-temperature measurement. However, it may be appropriate to simply average both indications, in which case the level of the metal-slag layer is determined for 50% by the oxygen measurement and for 50% by the bath-temperature measurement.

The graph of FIG. 2 does not show when the sublance was introduced into or through the slag. FIG. 2 shows only a portion of the recorded measurements.

Considering FIG. 2 the height of the sublance is 60 centimeters when the sudden change in bath temperature occurs and 65 centimeters when the maximum temperature is reached. The height of the sublance is 59.5 centimeters at the beginning of the rapid rise in oxygen concentration and 62.5 centimeters at the end of the rapid rise in oxygen concentration. Therefore, the median height of the sublance based on bath temperature is 62.5 centimeters while the median height of the sublance based upon a change in oxygen concentration is 61 centimeters. Utilizing an average of both heights or weighing the two heights equally the metal-slag layer is at a height of 61.75 centimeters.

Utilizing the 80-20% data for determination of the height of the metal slag layer the height would be weighted in favor of the change in oxygen concentration by 4/5 to 1/5 or a calculated height of 61.3 centimeters.

In FIG. 2 it can be seen that the curve for the height of the sublance shows a slow increase between the 125 current sample number and the 260 current sample number after which there is a rapid rise in the curve from the 260 current sample number to the 280 current sample number. The slow increase takes place at the time the measurements are being taken to determine bath height i.e. during the time the oxygen concentration rapidly increases and during the time the temperature of the bath abruptly increases. Once the measurements are taken there is no longer any need for a uniform increase in sublance height and the sublance can be rapidly removed from the bath. Also the increase in speed of the sublance withdrawal is stalled deliberately in order to prevent disruption of the slag layer which may otherwise contaminate the steel below the slag, therewith degrading the quality of the steel.

The height curve for the sublance was obtained by withdrawing the sublance from the bottom of the vessel at a predetermined rate of approximately 2.78 cm/sec. until after the oxygen concentration sensor emits signals indicating the boundary between the molten metal and the slag and the temperature of the bath suddely chances after which the sublance is rapidly withdrawn from the bath. The rapid withdrawal may take place at a rate of 18 cm/sec. Knowing the rate of withdrawal, the depth of the lance initially and the time elapsed, the height curve may be plotted.

To give some idea of savings obtainable, economizing on the bath level sensor produces an annual saving of approximately FL 65.000- for one steel ladle. Where several steel ladles are used, the saving is proportionately higher. Measuring time saved may lead to an effective production increase of 18 hours per steel ladle per year. Other advantageous effects of using the invention are less easy to quantify, but they are still important.

What is claimed is:

1. Method of measurement of the level of the surface of a bath of molten metal beneath a fluid layer of slag in a metallurgical vessel, comprising the steps of (i) moving a detector comprising an oxygen concentration sensor through said slag into said metal bath, (ii) withdrawing said detector from said metal bath through said slag, (iii) monitoring output signals of said oxygen concentration sensor during one of steps (i) and (ii), and (iv) determining from said output signals the interface of said surface of the metal bath and layer of slag.

2. Method according to claim 1 wherein said interface of said surface of the metal bath and layer of slag is determined when an abrupt change in the oxygen concentration is sensed.

3. Method according to claim 2 wherein said monitoring is performed during step (ii) and said interface is determined when an abrupt increase in oxygen concentration is sensed.

4. Method according to claim 1 wherein said detector further comprises a temperature sensor and the method includes monitoring also output signals of the temperature sensor during said step (iii) and in step (iv) determining the interface from both sets of output signals.

5. In a method of measurement of the level of the surface of a bath of molten metal beneath a fluid layer of slag in a metallurgical vessel, using a detector which is moved through the slag layer into the metal bath and then withdrawn, the improvement that the detector used comprises an oxygen concentration sensor which emits signals indicating the boundary between the molten metal and the slag, whereby the height of said boundary is determined.

* * * * *